(12) United States Patent
Covannon et al.

(10) Patent No.: US 6,543,899 B2
(45) Date of Patent: Apr. 8, 2003

(54) AUTO-STEREOSCOPIC VIEWING SYSTEM USING MOUNTED PROJECTION

(75) Inventors: Edward Covannon, Ontario, NY (US); John A. Agostinelli, Rochester, NY (US); Jose M. Mir, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/730,360

(22) Filed: Dec. 5, 2000

(65) Prior Publication Data

US 2002/0067466 A1 Jun. 6, 2002

(51) Int. Cl.⁷ .................. G03B 21/00; G03B 31/00; G09G 5/00; G02B 27/14
(52) U.S. Cl. .............. 353/7; 353/11; 353/15; 353/18; 359/630; 359/631; 359/632; 359/633; 345/7; 345/8; 345/9
(58) Field of Search ............ 353/7, 8, 11, 15, 353/38; 359/629, 630, 633, 631, 632; 345/7, 8, 9

(56) References Cited

U.S. PATENT DOCUMENTS

| | | | |
|---|---|---|---|
| 4,347,508 A | 8/1982 | Spooner | 340/705 |
| 4,439,157 A * | 3/1984 | Breglia et al. | 434/40 |
| 4,775,219 A | 10/1988 | Appeldorn et al. | 350/103 |
| 5,243,462 A | 9/1993 | Kobayashi et al. | 359/557 |
| 5,315,435 A | 5/1994 | Horiuchi | 359/554 |
| 5,418,584 A * | 5/1995 | Larson | 353/122 |
| 5,528,397 A | 6/1996 | Zavracky et al. | 359/59 |
| 5,606,458 A | 2/1997 | Fergason | 359/630 |
| 5,671,992 A | 9/1997 | Richards | 353/7 |
| 5,748,164 A | 5/1998 | Handschy et al. | 345/89 |
| 5,825,448 A | 10/1998 | Bos et al. | 349/128 |
| 5,976,017 A * | 11/1999 | Omori et al. | 463/32 |
| 6,034,717 A * | 3/2000 | Dentinger et al. | 348/51 |
| 6,069,608 A * | 5/2000 | Izumi et al. | 345/139 |
| 6,163,336 A * | 12/2000 | Richards | 348/42 |
| 6,292,305 B1 * | 9/2001 | Sakuma et al. | 359/649 |
| 6,323,999 B1 * | 11/2001 | Ueda et al. | 359/443 |
| 6,416,181 B1 * | 7/2002 | Kessler et al. | 353/7 |
| 2001/0043165 A1 * | 11/2001 | Stanton | 345/8 |

FOREIGN PATENT DOCUMENTS

| | | | | |
|---|---|---|---|---|
| JP | 64-029830 | * | 1/1989 | G03B/35/24 |
| WO | 00/34818 | | 6/2000 | G02B/27/01 |

OTHER PUBLICATIONS

"Micropolarizer-based multiple-viewer autostereoscopic display" by Benton, Slowe, Kropp and Smith in J.O. Merritt, SS. Fisher, and M.T. Bolas, Eds., SPIE Proc. vol. 3639 Stereoscopic Displays and Virtual Reality Systems VI (SPIE, Jan. 1999) paper 3639-10, p. 1.

ACM SIGGRAPH 99 Conference Abstracts and Applications document, p. 179, "Head-Mounted Projector".

* cited by examiner

Primary Examiner—Russell Adams
Assistant Examiner—Melissa Koval
(74) Attorney, Agent, or Firm—Frank Pincelli (57) ABSTRACT

Autostereoscopic images are produced by projecting a stereo pair of images onto a modified cube-corner retroreflective material. The cube-corner differs from that commonly available in that it has been altered to return the light to viewers eyes rather than directly back to the source of the projection.

14 Claims, 10 Drawing Sheets

AUTO-STEREOSCOPIC VIEWING SYSTEM USING MOUNTED PROJECTION

FIELD OF THE INVENTION

This invention is in the field of autostereoscopic displays and more particularly to autostereoscopic displays employing a head-mounted projector and retroreflective screen.

BACKGROUND OF THE INVENTION

Autostereoscopic displays present stereoscopic imagery to an observer with no need for special glasses and are very well known. A class of autostereoscopic displays often referred to as specular displays (see "Micropolarizer-based multiple-viewer autostereoscopic display" by Benton, Slowe, Kropp and Smith in J. O. Merritt, S S. Fisher, and M. T. Bolas, Eds., SPIE Proc. Vol. 3639 Stereoscopic Displays and Virtual Reality Systems VI (SPIE, January 1999) paper 3639–10, page 1) uses large lenses, mirrors or retro-reflectors to direct light from the source to the eyes of the observer.

A problem encountered in specular autostereoscopic displays relates to the need to track the eyes of the observer using an appropriate servo to maintain a condition whereby the light corresponding to the appropriate source images remain fixed on the eyes of the observer. For example, U.S. Pat. No. 5,671,992 by Richards discloses a display unit having a pair of projectors that relay separate stereo images to separate eyes of the observer. Light from the projectors is directed to a beam splitter and then to a retro-reflective screen where it is returned through the beamsplitter to the observer's eyes. In Richards, tracking and servo means are used to detect eye position and move the projectors to maintain coincidence of the observer's eyes and the images of the projector's exit pupils formed by the screen. An approach to the problem of this type requires extensive equipment, displays that must anticipate all possible head positions, limitations of the viewer's movement and are confined to an audience of one for each display.

A different approach was taught by Masahiko Inami as documented in the ACM SIGGRAPH 99 Conference Abstracts and Applications document, page 179, "Head-Mounted Projector" and by U.S. Pat. No. 5,606,458 granted to Fergason. In these references, viewer-head-mounted projection systems are disclosed that use retro-reflective material to return the projected light from a pair of head-mounted projectors back into the viewer's eyes. Thus, an automatic registration of the image of the exit pupils of the projectors with the observer's eyes is achieved. However this method requires mounting not only the projectors upon the head, but also mounting a beam-splitting apparatus before the eyes since the projected beams are reflected from a conventional retro-reflective screen directly back to the source. Wearing beam-splitters reduces the amount of light returning to the eye, is cumbersome and ungainly as well being fragile and possibly dangerous if the viewer collides with an object.

U.S. Pat. No. 4,347,508 to Spooner describes a head-coupled area of interest stereoscopic visual display incorporating a bead-type retro-reflective screen having a surface modified by incorporation of a diffractive overlayer. The overlayer provides a deflection of the retro-reflected light from its conventional trajectory so that the modified retro-reflected light is aligned with the location of the eyes of the observer. The deflection provided by the overlayer is achieved by a diffractive effect. The '508 patent gives a design of an overlayer suitable for 550 nm or a narrow wavelength range in the vicinity of 550 nm. A single diffractive order of the overlayer grating is directed below the line of incidence and into the viewer's eyes. Unfortunately, the diffractive deflection of the retro-reflected light is a wavelength sensitive deflection. As is readily apparent, this approach is unsuitable for full color images as the individual spectral components of the light will be returned in different directions. Also, the diffractive approach to retro-reflective screen modification deflects returning light from the line of incidence by a specific angle and so is operative only at a specific viewing distance from the screen.

The display system of the present invention provides a user with the visual perception of peering into a stereoscopic three dimensional scene by projecting left and right images onto a retroreflective screen that has been modified to return the projected light directly to the eye of the observer and by using a dynamic imaging system that responds to movement to alter the scene content in a manner consistent with the observer's movement.

SUMMARY OF THE INVENTION

The present invention provides a superior solution in that the system invented has all the benefits of a head-mounted projection system coupled with retro-reflective display, but by eliminating the need for beam splitters it addresses the previously described shortcomings of encumbrance, lack of brightness, weight and fragility. This is accomplished by using a modified cube-corner retro-reflective material. Normally, cube-corner material reflects a beam back directly along the beam's source path. By using a deformed cube-corner material, the beam is reflected back along a different path directly to the eye rather than to the projector. Because the modification of the retro-reflective behavior is accomplished by reflection (not diffraction) in the modified cube-corner elements, the modified screen functions properly with multicolor and even with full color images.

BRIEF DESCRIPTION OF THE DRAWINGS

In the detailed description of the preferred embodiments of the invention presented below, reference is made to the accompanying drawings in which.

These and other aspects, objects, features, and advantages of the present invention will be more clearly understood and appreciated from a review of the following detailed description of the preferred embodiments and appended claims, and by reference to the accompanying drawings.

BRIEF DESCRIPTION OF THE DRAWINGS

Figure 1A:
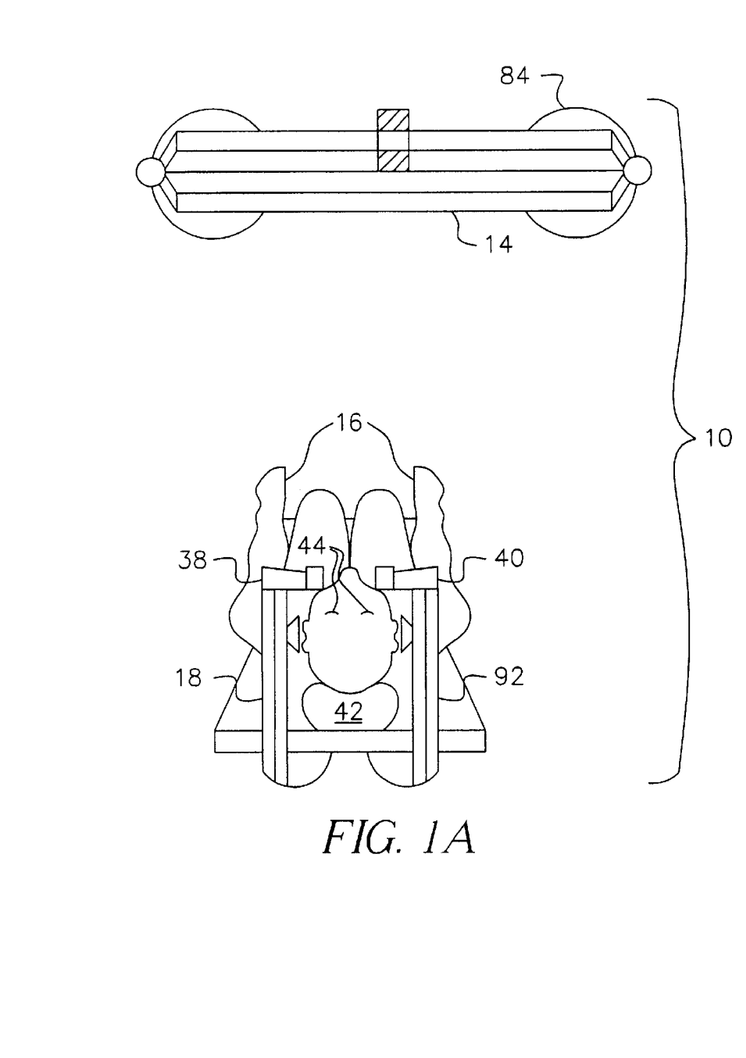
FIG. 1a depicts a top view of a preferred embodiment of the mounted autostereoscopic projection system in accordance with the present invention.
Figure 1B:
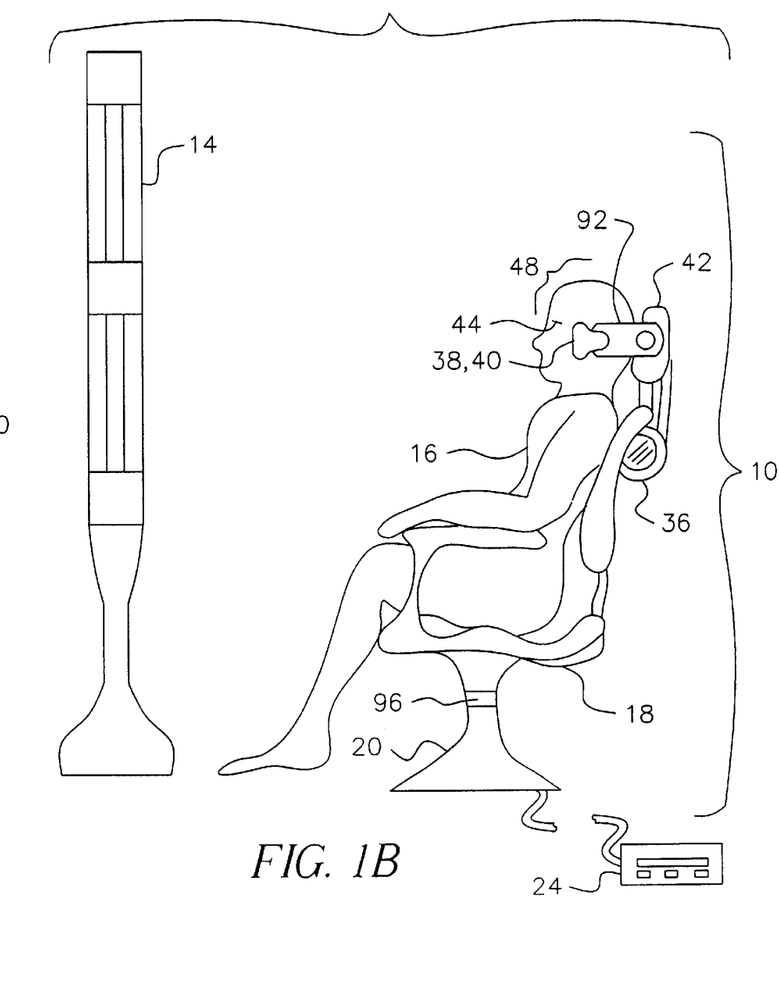
FIG. 1b depicts a side view of a preferred embodiment of the mounted autostereoscopic projection system in accordance with the present invention.
Figure 2:
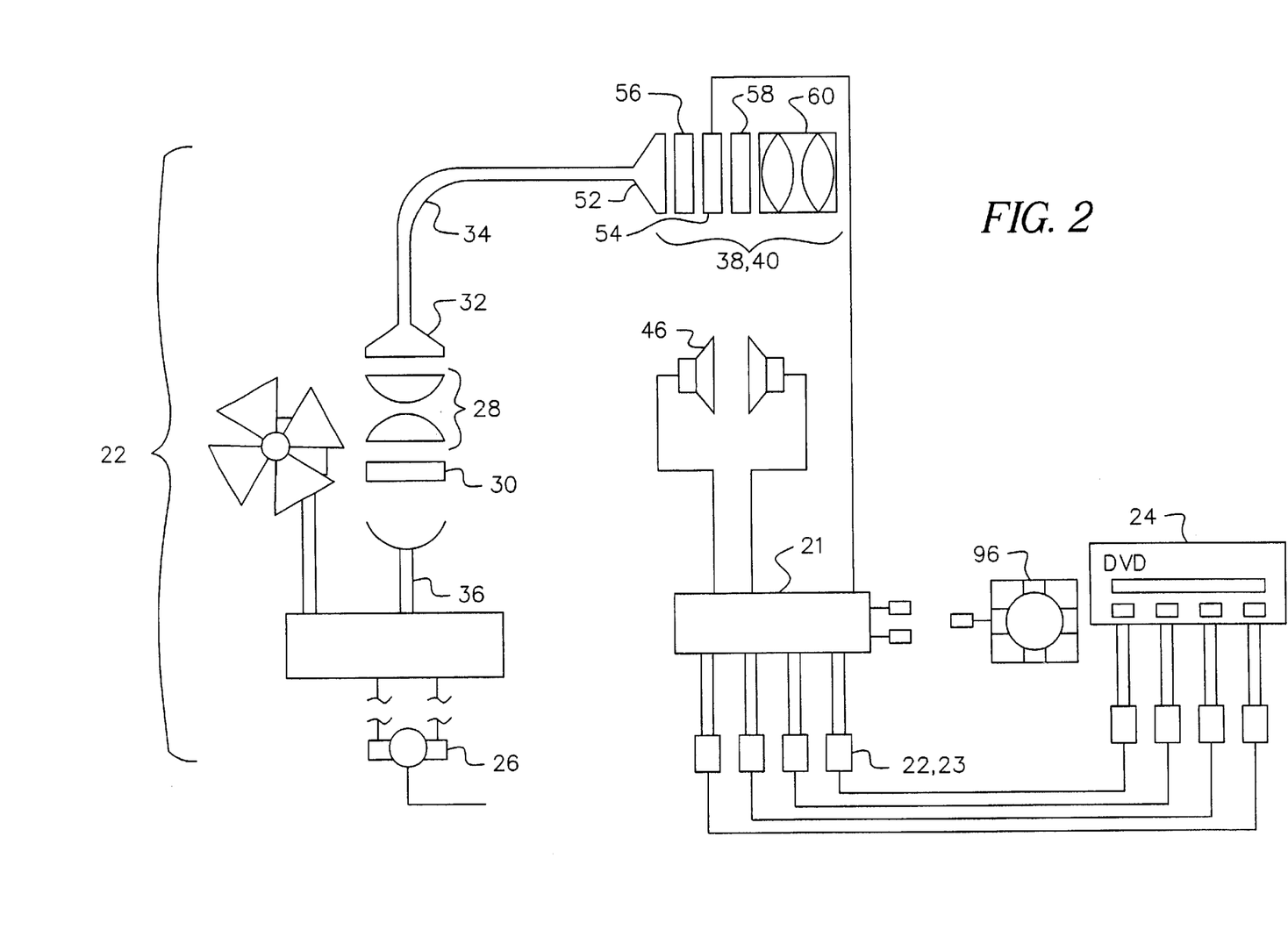
FIG. 2 is a schematic diagram of the construction of projection components in accordance with the present invention.

In the detailed description of the preferred embodiments of the invention presented below, reference is made to the accompanying drawings in which:

Referring to FIGS. 1a, 1b and 2 there is illustrated a display system 10 made in accordance with the present invention. The system includes a display screen 14 that is viewed by an observer 16 that is seated in a chair 18. In the embodiment illustrated the chair 18 is rotatably mounted onto a base 20 so that the chair 18 can be rotated for adjusting the viewing by the observer 16. The system 10 includes an imaging system 22 for projecting an image onto display screen 14. The imaging system 22 includes a computer 21 and digital imaging source 24 for obtaining digital images. The computer 21 is used for controlling the appropriated components in the system 22 and for providing or receiving information from other system and/or components in system 10. In the embodiment illustrated the image source is a Digital Video Disc (DVD) player which produces both a visual image signal but also an audio signal.

In the embodiment illustrated in FIG. 2, the imaging system 22 further includes an illumination system 36 for illuminating the image from source 24 on to a lens assembly 60. An optional infrared filter 30 is provided to dissipate heat for safety reasons. Uniform, filtered illumination emerging from the lens assembly 28 is then incident on an input face 32 of a fiberoptic bundle 34. The imaging system 22 includes a pair of spaced image projectors 38, 40 for displaying of an image on screen 14. In the particular embodiment illustrated in FIG. 1, the projectors 38, 40 are mounted on head rest 42 that secured to chair 18. The projectors are mounted closely adjacent the eyes 44 of observer 16 such that the images projected from projectors 38, 40 will reflect off screen 14 on to eyes 44 as discussed in detail later herein. The image signals from imaging source 24 are transmitted to projectors 38, 40 by fiber bundle 34. In addition, the audio portions associated with the images are also transmitted to appropriate audio transducers such as speakers/headphones 46. It is to be understood that the audio may be delivered using any conventional monaural, stereo, or surround-sound techniques well-known in the audio art. FIG. 1 shows the light source 36 attached to the chair 18 an adequate distance from the ears of the observer 16 to insure that their operation will not interfere with the sound accompanying the display and to keep excess heat away from the observer's head 16.

Fiberoptic bundle 34 carries light from the illumination system 36 to projectors 38, 40. In particular the output end 52 of fiberoptic bundle 34 transmits the image to the light valve arrays 54. Suitable light valve array devices 54 for the purposes of the invention include but are not limited to so-called microdisplays of the following types: transmissive liquid crystal displays, reflective liquid crystal displays, liquid crystal on silicon devices, deformable micro-mirror devices, grating light valve devices and the like. It is understood that required polarization elements, for example, polarizer 56 and analyzer 58 or other elements appropriate for each light valve option are included. The spatially modulated light from the light valves then enters lens assembly 60 in each projector 38, 40. Lens assembly 60 projects an image beam 82 (FIG. 7) onto the modified retro-reflective screen 14.

Retro-reflection is a concept familiar to those skilled in the art of optics and pertains to the ability of certain surfaces to reflect rays of light largely back to their source. This is in comparison to standard diffuse reflecting surfaces which disperse light rays in all directions. When a retro-reflecting surface is illuminated by projecting an image onto it, the light is reflected largely back to the source thus presenting an observer near the source with a brighter image for a given illumination than a similar observer would see further away from the source or when such an observer shines light onto a standard diffuse reflecting material. Retroreflective screens allow a less powerful light source to be used to provide a sufficient level of illumination to an observer.

An example of a retro-reflective screen surface is "cube-corner" screen material. While retro-reflective screen material (such as the glass beaded surface of projection screens or traffic signs) largely reflects light rays back to their source, "cube-corner" screen material reflects light rays almost entirely to their source. For image projection onto a cube-corner screen, the screen effectively forms an "image" of the exit pupil of the projection lens back onto the projection lens exit pupil.

Figure 3A:
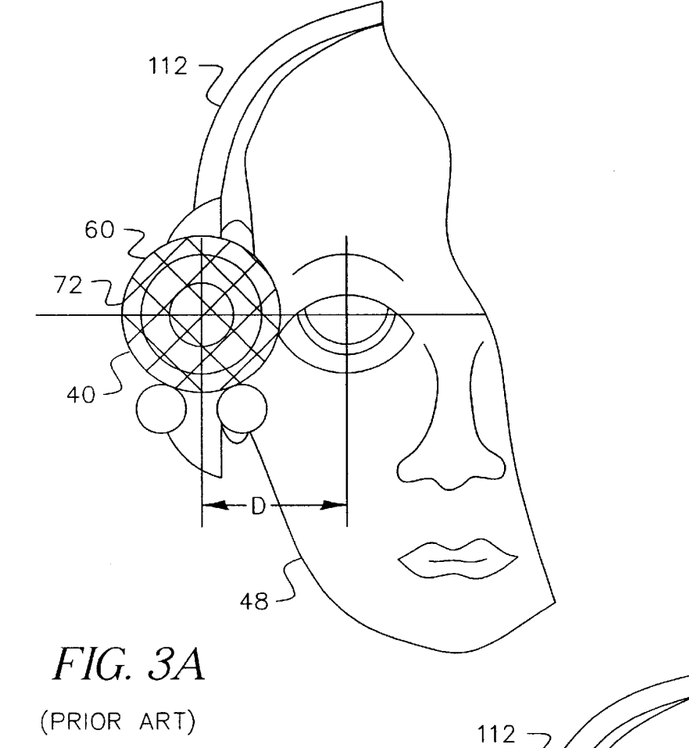
FIG. 3a is a frontal view illustrating how a prior art retroreflective screen returns light directly to the projection source.

When a ray of light enters a 3-sided, cube-corner element whose internal surfaces are reflective and intersect at a 90 degree angle, the entering light reflects off the cube's internal walls until exiting on the same heading that brought the light ray into the cube. Cube-corner screen material has a surface composed of many such small cube-corner elements. The crosshatching in FIG. 3A illustrates the reflected image area produced with respect to the respective projector 38, 40.

By selectively modifying the cube-corner's internal angles of intersection from 90 degrees, the light ray's exit path from the cube-corner is made to differ from the entrance path, causing the trajectory of the reflected returning rays to deviate from the conventional retro-reflective condition. For a modified cube-corner screen comprising a plurality of such modified cube-corners, light reflected from the modified screen no longer forms an "image" of the projector exit constrained to the immediate area of (and radially surrounding) the projection lens assembly 60 referred to above. Instead, the modified screen forms a reflected "image" of the image exiting the projector 38, 40 to an area around the projection lens assembly 60. The nature of the expanded area of reflection can be controlled by the deviation of cube-corner dihedral angles from 90 degrees. In the preferred embodiment, the angles are modified so the exiting light rays form a horizontally elongated "image" of the projector exit pupil in the plane of the projector lens exit pupil as best illustrated by reference to FIG. 3B. As can be seen, that the reflected image of a modified cube-corner forms an elongated image area 70 (indicated by crosshatching in the illustration) centered on the projector lens assembly 60 as opposed to the generally circular reflective image area 72 of the standard cube-corner. The circular area of a prior art cube-corner display screen is not seen in a manner suitable for the observer, as the reflected image is reflected toward the associated projector. In contrast to the use of a modified cube-corner reflective screen made in accordance with the present invention, the projectors 38, 40 are positioned adjacent the head 48 of observer 16 so that a portion of the reflected image area 70 for each projector will cover the eye 44 of the observer 16 so that the observer can easily view the reflected image from the single adjacent projector.

The present invention avoids the need for the beamsplitters required in the prior art stereoscopic viewers. In addition the horizontal elongation of the reflected beam provides an advantage in that modest movements of the head of the observer 48 toward or away from the screen 14 do not result in the eye moving out from under the area of the reflected light beam. This results in a system that is tolerant of natural movement. A retro-reflecting screen modified to merely deflect the "image" of the projector exit pupil onto the position of the observer's eye would result in a brighter image as viewed on the screen but would give up the tolerance to movement referred to above.

Figure 4A:
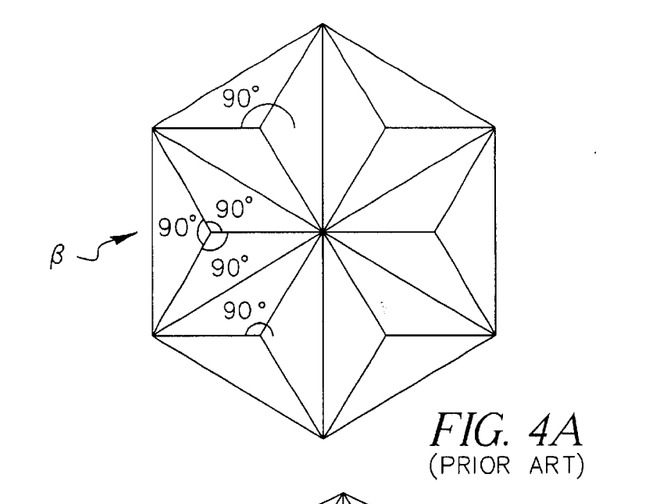
FIG. 4a is a detail drawing of prior art unmodified cube-corner screen element.
Figure 4B:
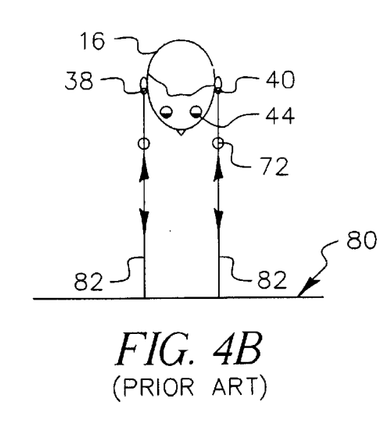
FIG. 4b is a schematic diagram illustrating how a prior art retroreflective screen returns light directly to the projection source.
Figure 4C:
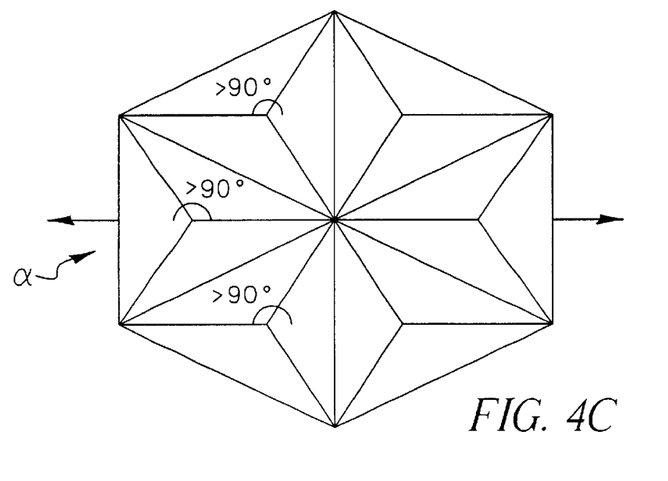
FIG. 4c is a detail drawing of a modified cube-corner screen element in accordance with the present invention.

FIG. 4a shows an element from a conventional cube-corner retroreflective screen which provides a reflected image area illustrated by FIG. 4b. FIG. 4c shows an element from a modified cube-corner retro-reflective screen made in accordance with the present invention which would be expected to provide the reflected image results illustrated in FIG. 4d. U.S. Pat. No. 4,775,219 teaches the preparation of tooling for the production of the type of modified cube-corner reflector element shown in FIG. 4c. The element of FIG. 4b differs from the conventional element of FIG. 4a in that the angles a are wider than the 90 degree angles β of FIG. 4a. The deviation of angles a from 90 degrees causes a deviation from true retroreflection such that the aforementioned horizontal elongation of the retroreflection of the "image" of the projector lens assembly 60 is achieved.

Figure 4D:
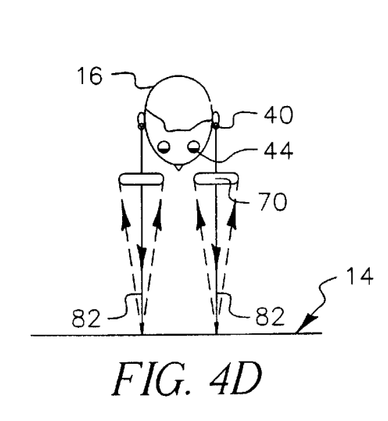
FIG. 4d is a schematic diagram illustrating how the retroreflective screen of the present invention returns light to the observer's eyes.

FIG. 4b illustrates how a screen of conventional cube-corner retroreflective material 80 returns a projected light beam 82 substantially to the projection lens 38, 40. FIG. 4d illustrates that images projected onto a screen 14 of modified retroreflective cube-corner screen material are reflected as sufficiently elongated image areas that cover the eye closest to each projector 38, 40 without intersecting the other eye thus minimizing crosstalk of left and right images. Light from the modified retro-reflective screen 14 thus is returned by the screen directly to the eyes 44 of the observer 16.

Figure 5:
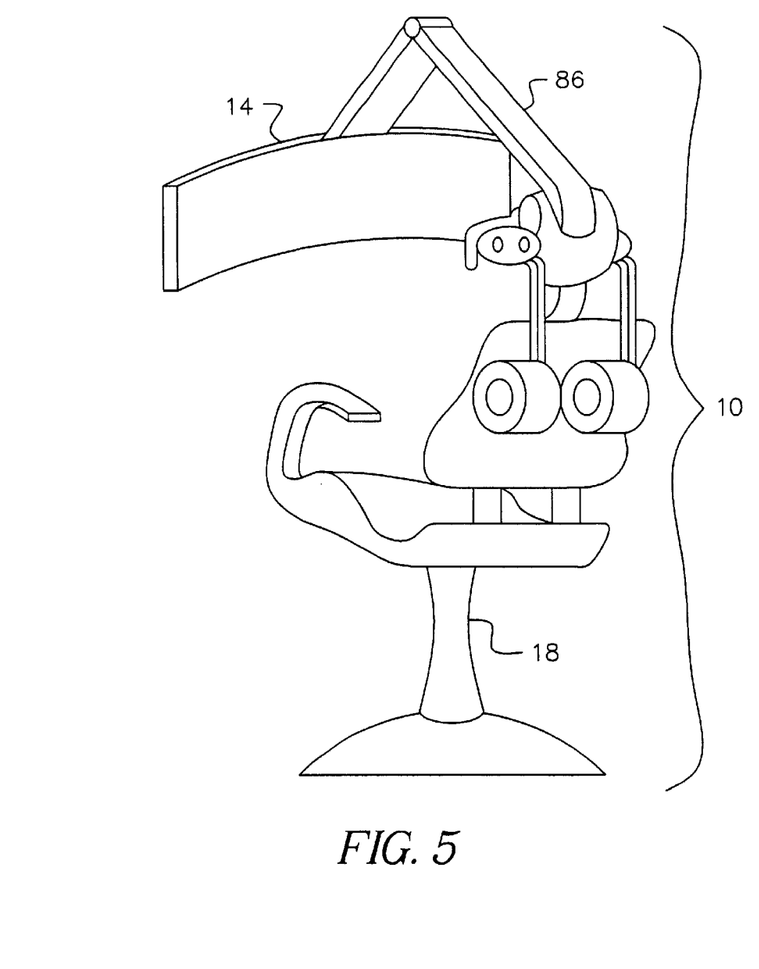
FIG. 5 is a diagram showing the boom-mounted screen arrangement of the invention in accordance with the present invention.

In the embodiment illustrated the modified retro-reflective screen 14 is mounted upon feet 84 (FIG. 1) to allow it to stand upright and be easily movable. The screen may be mounted in any desired manner, for example but not by way of limitation the screen 14 may be hung from a boom 86 attached to the chair 18 as shown in FIG. 5, hanging the screen on a wall, from a ceiling or free-standing structure, or adhered to a surface or a wall.

In the embodiment illustrated the cube-corner material has been modified to horizontally elongate the reflected image area. Thus the projectors 38, 40 are positioned horizontally adjacent the eyes 44 of the observer 16. Therefore as the shape of the cube-corner elements is modified, the projections will be appropriately positioned with respect to the eyes 44 of the observer 16.

Figure 3B:
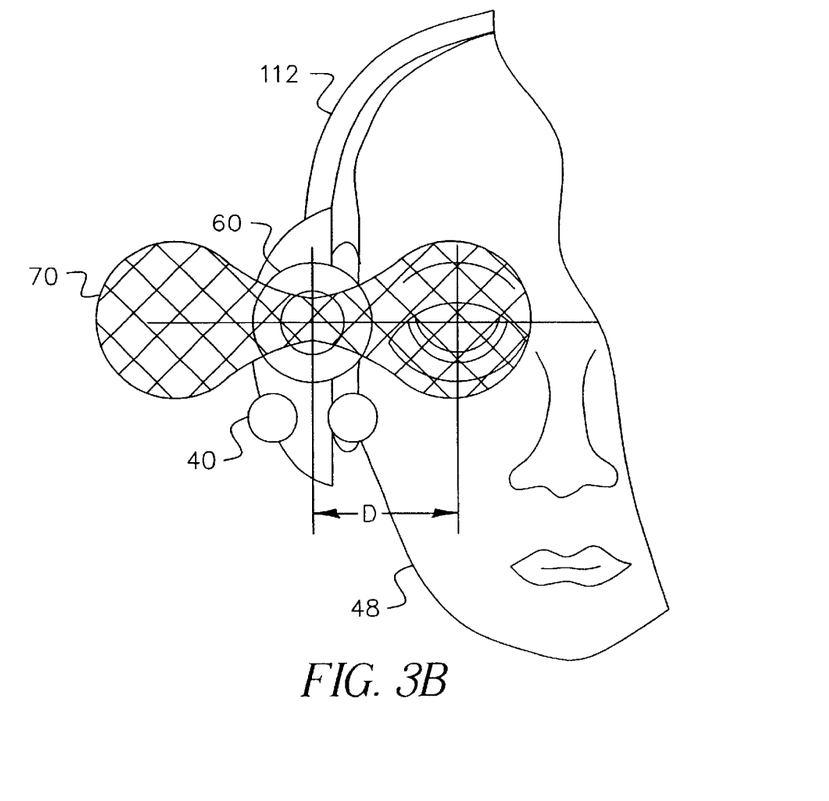
FIG. 3b is a frontal view illustrating how the retroreflective screen of the present invention returns light to the observer's eyes.

As shown in FIGS. 3a and 3b, the projectors 38, 40 are preferably located a short distance D away from each respective eye. The distance D is chosen to provide the best combination of observer comfort and image brightness. It is also important that the left/right crosstalk, i.e. light from the left projector 38 entering the right eye and the light from the right projector 40 entering the left eye is kept small as illustrated in FIGS. 6b and 6d. This prevents the appearance of undesirable ghost images. For a given screen and observer distance from the screen, crosstalk can be controlled by the positions of the projector 38, 40 with respect to the adjacent eye. At large lateral distances D, little light will fall upon the eyes 44 of the observer 16. Moving the projectors 38, 40 larger distance D demands higher distortion of retro-reflecting elements to spread light of the exit pupil "image" over a larger area.

Figure 6A:
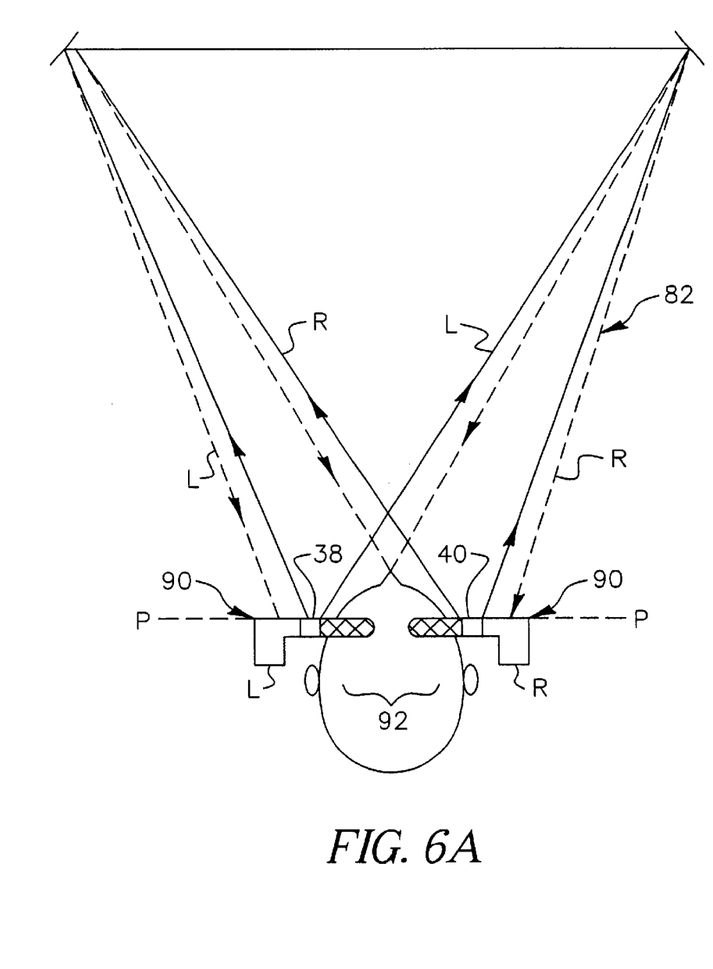
FIG. 6a is a top view illustrating how the retroreflective screen of the present invention returns light to the observer's eyes.
Figure 6B:
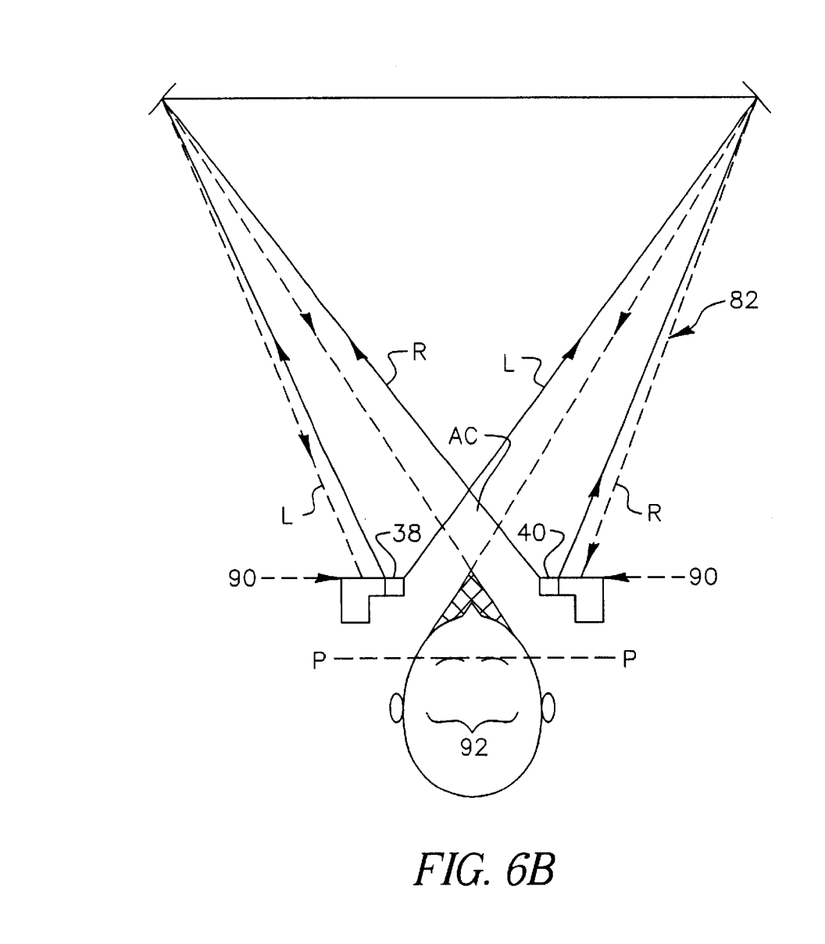
FIG. 6b is a top view that illustrates crosstalk due to having the projection lenses further forward to the screen than the eyes and peripheral occlusion by the projectors.
Figure 6C:
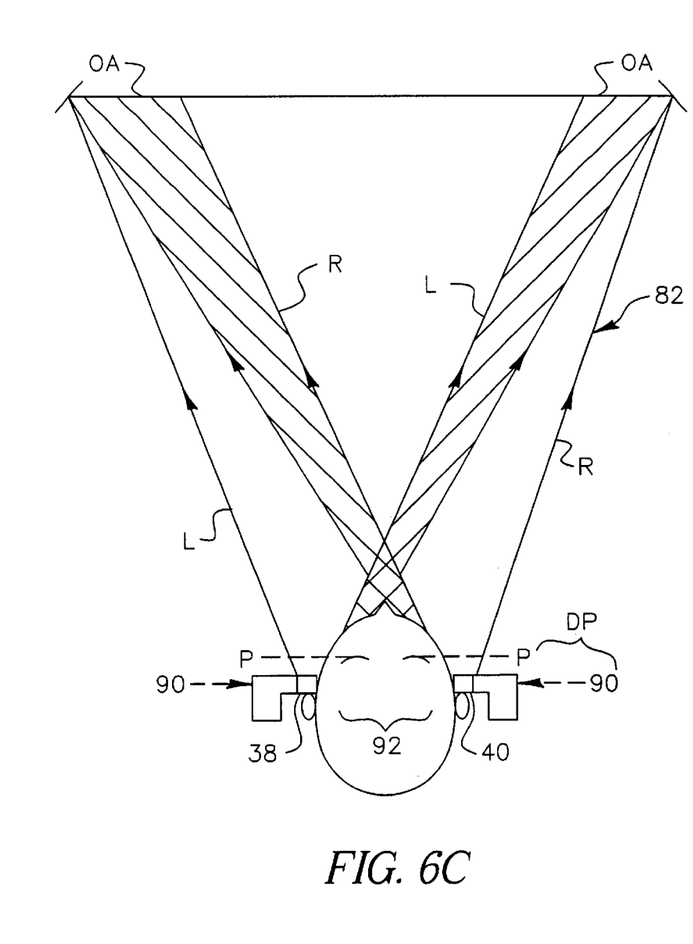
FIG. 6c is a top view that illustrates facial occlusion of the projection due to having the projection lenses further back from the screen than the eyes.
Figure 6D:
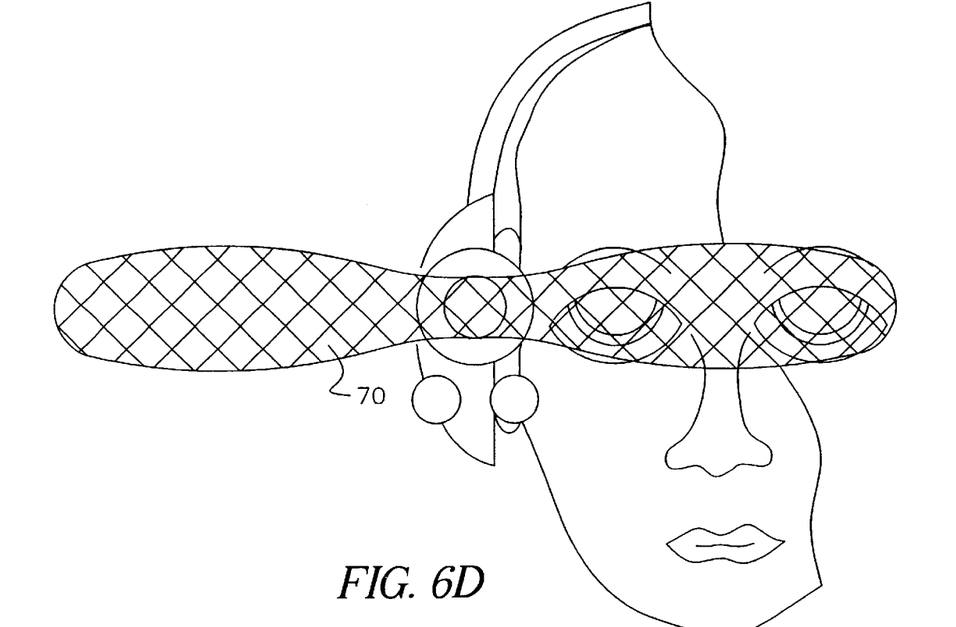
FIG. 6d is a frontal view that illustrates crosstalk due to having the projection lenses further forward to the screen than the eyes.
Figure 6E:
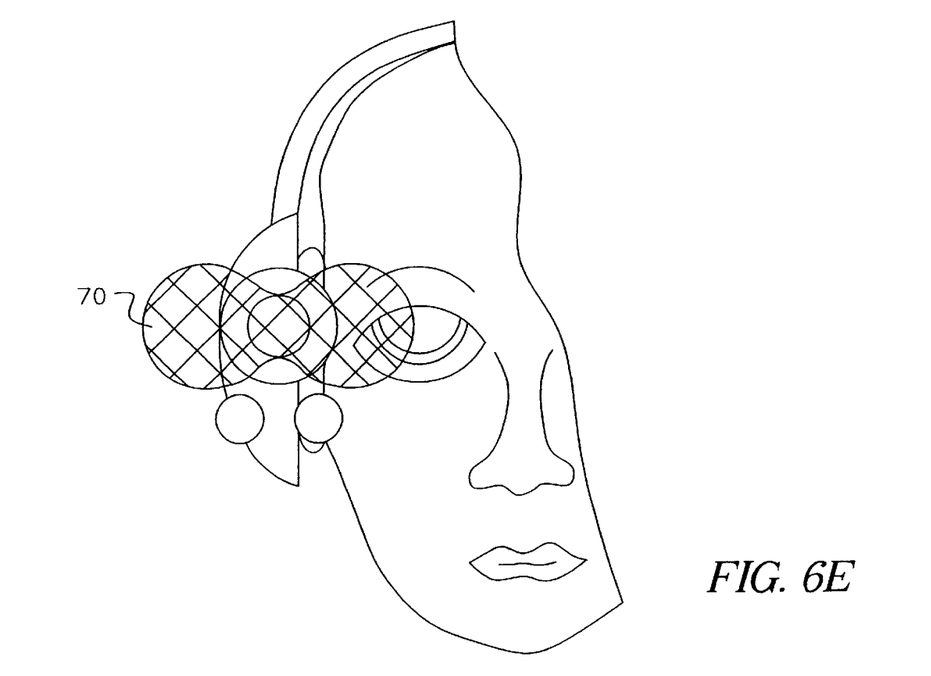
FIG. 6e is a frontal view that illustrates occlusion due to having the projection lenses further back from the screen than the eyes.

The forward/backward positioning of projectors 38, 40 is preferably such that the forward end 90 is positioned at a plane P coincident with the observer's face 92' as illustrated in FIG. 6a. If the forward end 90 of projectors 38, 40 are positioned a distance DP backward from plane P as illustrated in FIG. 6c. then projected light may be occluded by the head of the observer 16 creating an occluded area OA. In addition, backward placement required additional elongation of the projected image to compensate for the natural reduction of image that results from having the projector back from plane P, as illustrated in 6e. If the projectors 38, 40 are positioned substantially forward of plane P as illustrated in FIG. 6b, the projectors 38, 40 may occlude the peripheral field of view of the observer 16 as well as creating a situation where each eye sees some portion of both the left and right image, creating an area of image crosstalk AC as previously described.

In the embodiment illustrated by FIGS. 1–4, two separate projectors 38, 40 are provided for images to be viewed by each of the respective eyes. However, the present invention is not so limited. In another form of the present invention a illumination scheme may be provided by using a single illumination system and a beamsplitter to feed the left and right fiberoptic bundles. In yet another alternative system, single illumination system and a bifurcated fiberoptic bundle may be provided to split the illumination light into left and right portions.

Full color images may be produced by the display in FIG. 1 by any of the suitable techniques well known in the art. Such techniques include sequential color projection with alternating red/green/blue LEDs, illumination by the use of an interposed color wheel or DigiLens (TM), a switchable color filter element (see U.S. Pat. No. 5,825,448), separate RGB light valve arrays and beam-combining optics, or a single array with an integral color filters, and the like.

Referring back to FIG. 1, the image projectors 38, 40 and audio speakers/headphones 46 are attached to supports 92 that are attached to the headrest 42 that can be adjusted in height. The supports 92 are preferably attached so that they can be pivoted to allow the image projectors 38, 40 to be moved wider apart to allow the observer 16 to easily sit down or get up from the chair 18. Pivoting the supports 92 allow them to be moved out of the way by moving them up or down is an alternative that could be used. In addition, the supports 92 can be brought in closer to the head to allow the closest comfortable position to the sides of the head when the observer 16 is seated. Any commonly available type or construction of headrest height adjustment that securely holds the headrest 42 and the projectors 38, 40 is suitable.

In the embodiment illustrated, the image projectors 38, 40 and audio transducers 46 are mounted on supports 92 in such a fashion that allows them to be adjusted for horizontal proximity to the head of the chair's occupant. This is done to allow proper positioning of the projector's output upon the left and right eyes. The projectors 38, 40 are mounted on the arms so they can freely pivot in response to adjustments of the chair 18 (such as seatback rake) that would otherwise move the projected light vertically off the screen in a way that a portion of the top or bottom of the screen would be left unilluminated. The use of freely pivoting projection assemblies and constraints on the degree to which the occupant can adjust the chair, insure that regardless of how the chair's occupant adjusts the chair, the projected image will continue to fill the screen from top to bottom. Preferably, the projectors 38, 40 are autofocusing and can employ any suitable technique familiar to one skilled in the art of projection and common on still and motion cameras.

Figure 7:
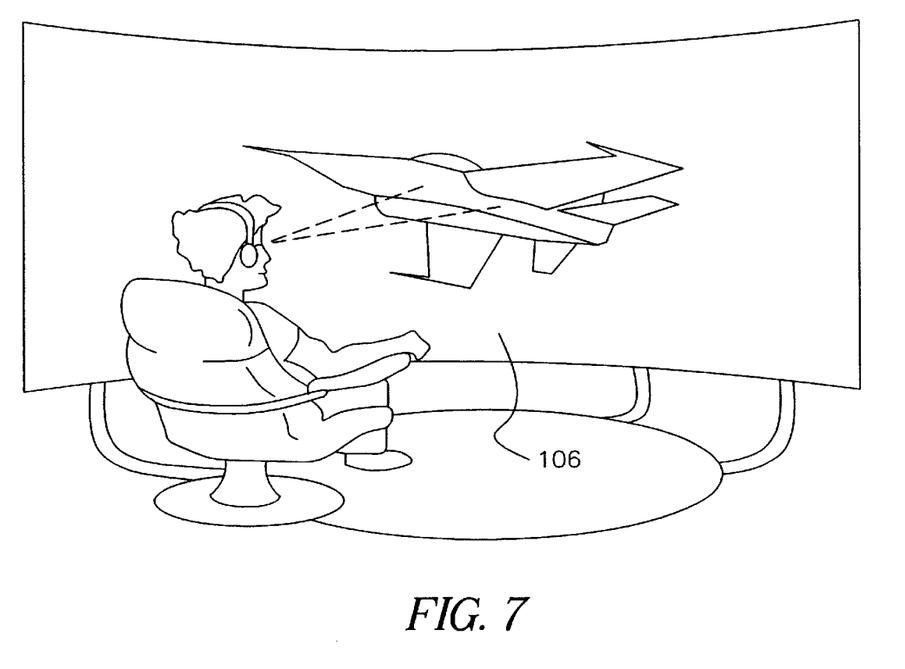
FIG. 7 is an illustration of a cylindrical display system in accordance with the present invention with an observer wearing a head mounted projection display embodiment.

In order to keep fixed objects in an image in a fixed position with respect to the screen 14 while the projectors 38, 40 moves, a position and orientation sensing subsystem may be provided. Position tracking techniques for projector 38, 40 orientation sensing include: inertial systems using accelerometers and gyros, ambient systems using magnetometers, tilt sensors; optical fiducial tracking systems, electromagnetic tracking and the like. A well suited position and orientation tracking subsystem for the chair 18 of the embodiment of FIG. 1 of the present invention includes a rotational position encoding device 96 mounted to measure rotation of the chair 18 about a pivoting axis. Any suitable commercially available rotational position encoders can be used. This position information is used to control and modify the source imagery being sent to the projectors 38, 40 such that moving the projectors 38, 40 causes shifting of the source image to compensate for physical shifting of the projected image with respect to screen 14 caused by movement of the projectors 38, 40. The rotational positional information is forwarded to a computer 21 that is used for modifying the output of imaging source 24. The result of the sensing and compensation is to fix still objects in the scene to an unmoving spot on the screen 14. A distortion of the projected image will occur if the projector optical axes deviate from being perpendicular to the screen 14. Such distortion (and distortions due to other causes, such as lens characteristics) can be optionally compensated for by pre-distorting the source imagery in a manner that is cancelled in projection. Keystone compensation for side-to-side rotation is unnecessary if a screen 106 having a cylindrical geometry is used as shown in FIG. 7. In another form of the present invention, the projectors are gimbaled so that the optical axes of the projectors are always substantially in the same position for forward and backward tilting of the chair.

Figure 8:
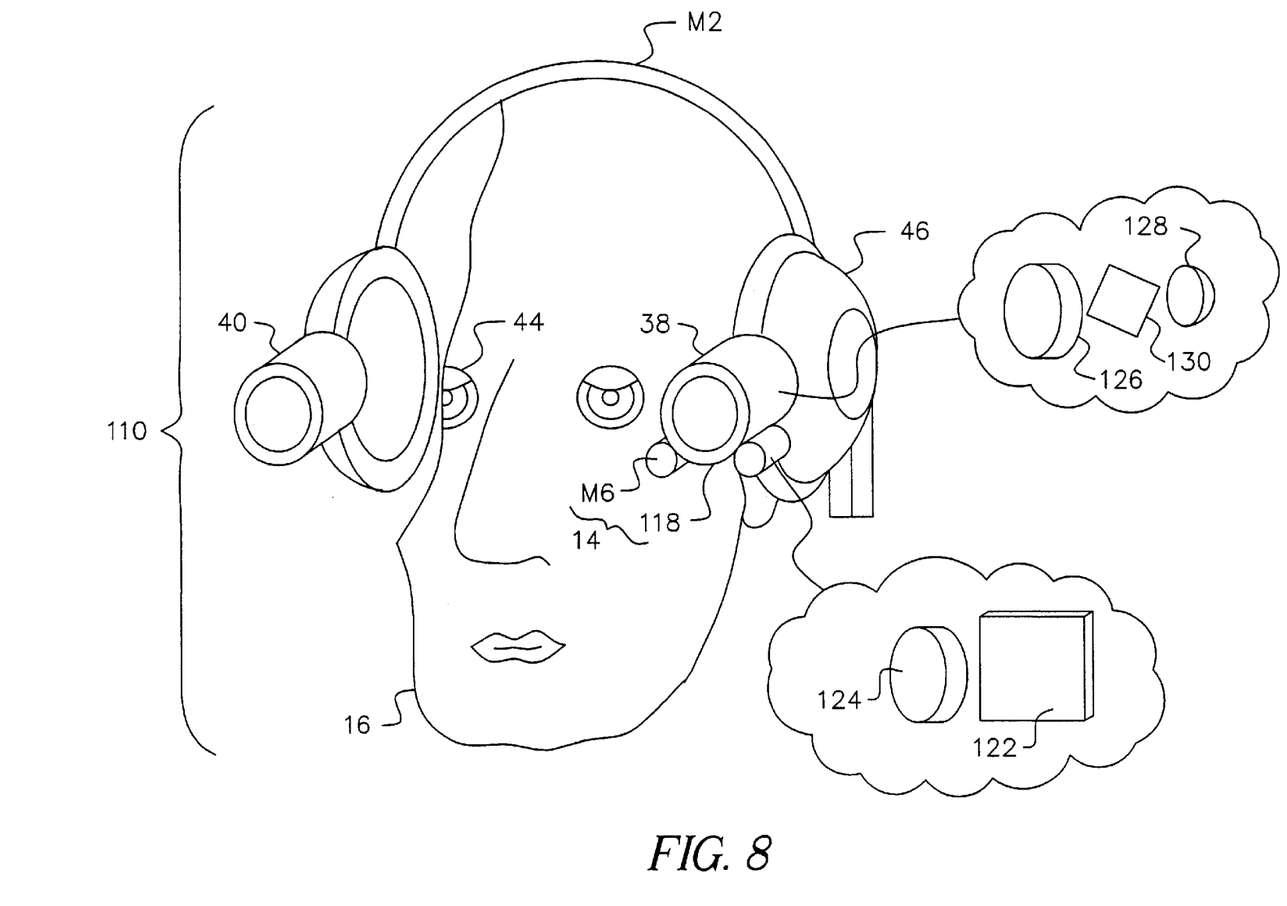
FIG. 8 is a perspective drawing of an alternative embodiment of the present invention that comprises a head-mounted projection display device.

Referring to FIG. 8 there is illustrated a modified form of the present invention which incorporates a head-mounted projection system 110 which includes an image stabilization system wherein like numerals indicate like parts and operation as previously discussed The system 110 comprises a an adjustable headband 112 that is worn by observer 16. Imaging projectors 38, 40 and audio transducers 46 such as speakers or headphones are attached to the adjustable headband 112. Any commonly available form of adjustable headband that securely holds the projection apparatus is suitable. Imaging projector locations are determined by considerations similar to the analogous discussion already given above for the chair-mounted embodiment of the invention. Since in the present embodiment, projectors 38, 40 are worn on the head, there is no additional comfort afforded by moving the projectors laterally outward. The projectors 38, 40 are preferably located in close proximity to the head of the observer.

In addition, an optical position-sensing subsystem 114 comprising ultraviolet (UV) source 116, and UV camera module 118, provides information on the spatial relationship of the headband mounted projectors 38, 40 to the modified retro-reflective screen 14 which has painted upon its surface fiducial marks 120 that are illuminated by UV source 116 and thus seen by the UV camera 118 whose output is sent to computer 21 for conversion into positional information that is then used to modify the output image in order to maintain a fixed image in a fixed position.

Figure 9:
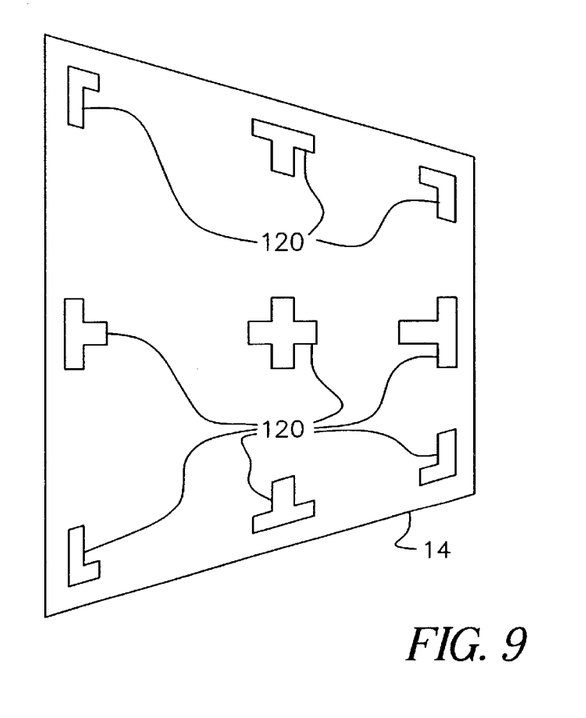
FIG. 9 is an illustration of a rectangular retroreflective screen with UV fiducials in accordance with the present invention; and, FIG. 10 is an illustration of a hemispherical retroreflective screen for use with a head-mounted projection system in accordance with the present invention.

FIG. 9 shows an example of fiducial marks 120 that have been added to the modified retroreflective screen 14. The fiducial marks 120 of ultraviolet absorbing material, which are invisible to the human eye, are applied to the screen 14 surface by any appropriate technique, for example but not limited to, screen printing, stenciling, web-printing, and the like. A sensing subsystems 114 senses the fiducial marks 120 to extract information regarding the position and orientation of the projectors 38, 40 relative to the screen 14. In the embodiment illustrated, the system 114 includes ultraviolet sensitive camera module 118 and ultraviolet source 116. Under illumination from an ultraviolet source 116 the marks 120 (FIG. 18) appear as dark shapes.. In the embodiment illustrated ultraviolet source 116 is a UV light emitting diode. The camera module 118 preferably comprises a CMOS or CCD sensor array 122 and an objective lens 124 and appropriate circuitry. As the projectors 38, 40 rotate, tilt or move in any way, the ultraviolet marks 120 change position in the visual field of the camera module 118. The fiducial image information is used to determine the orientation of projectors 38, 40. Source imagery is then shifted such that fixed objects in the scene remain projected at fixed positions in space and so appear fixed in the reference frame of the screen. Such motion compensation is similar to that used for viewing of virtual worlds in head-mounted displays, with computer generated imagery. For photorealistic imagery not created by computer 3d graphic programs (for example, stereoimagery derived from photographs), the source imagery provided to the projectors 38, 40 requires source data that provides a fill field of view, a full field being a source field of view larger than the instantaneously available field of view which is limited by the head-mounted projectors of the invention. Optionally, modifications to source imagery can include predistortion to compensate for possible keystone distortion as discussed previously.

Optical image stabilization techniques, for example, as disclosed in U.S. Pat. Nos. 5,243,462 or 5,315,435 assigned to Canon, may be employed to assist in the compensation of head-mounted projector movement.

The projectors 38, 40 comprise conventional microdisplays (e.g. as disclosed in U.S. Pat. No. 5,748,164 to Displaytech and U.S. Pat. No. 5,528,397 to Kopin), lens assemblies 126, and circuitry for video and audio(not shown). Preferably, light sources 128 typically supplied with microdisplay light valves 130 are replaced with brighter sources, for example higher power LEDs. Both reflective and transmissive microdisplay device types are useful for the purposes of the invention. It is the very high gain of the modified cube-corner system that allows the relatively low optical power microdisplay devices to be useful.

Lens assemblies 126 project spatially modulated light from the microdisplay devices onto the modified cube-corner retro-reflector screen 14 as with the chair-mounted embodiment of FIG. 1 as described above.

Power to projectors 38, 40 may be provided by batteries or from a remote supply may be carried by wire to the projectors 38, 40.

In this embodiment information is preferably input to the projectors by means of a high bandwidth RF (radio frequency) wireless connection such as disclosed in commonly assigned U.S. patent applications Ser. Nos. 09/089,204; 09/392,881; 09/519,199; and 09/575,597. Other possible forms of connection include wires and IR (infrared).

The audio and image signals are brought to audio and video circuitry for processing. The processed signals are channeled to the appropriate left and right audio speakers/headphones 46 and left and right micro-displays light valves 130. As with the chair-mounted embodiment of FIG. 1 described above, the spatially modulated light from microdisplays 130 is projected as left and right images via a modified retro-reflective surface into the respective left and right eyes of the observer. Again, as with the chair-mounted embodiment of FIG. 1, the modified cube-corner retro-reflective screen 14 forms horizontally elongated reflected images from the projectors 38, 40, a portion of each intersecting the respective eyes 44 of the observer 16.

The projectors 38, 40 are attached to the headband 112 an adequate distance from the eyes of wearer to insure that the reflected projection will fall upon the eye closest to the associated projector. The projectors 38, 40 optionally comprise subsystems for achieving autofocusing using suitable techniques familiar to the art and well known on still and motion cameras. Preferably, the autofocusing is achieved by gauging the distance from the observer 16 to the screen 14 by measuring the change of scaling of the pattern of fiducial marks 120.

As an alternative to readily available micro-display subsystems, other light valve array devices combined with suitable light sources can be utilized.

Full color images may also be produced by any of the techniques well known to the art and already described above for the chair-mounted embodiment.

Figure 10:
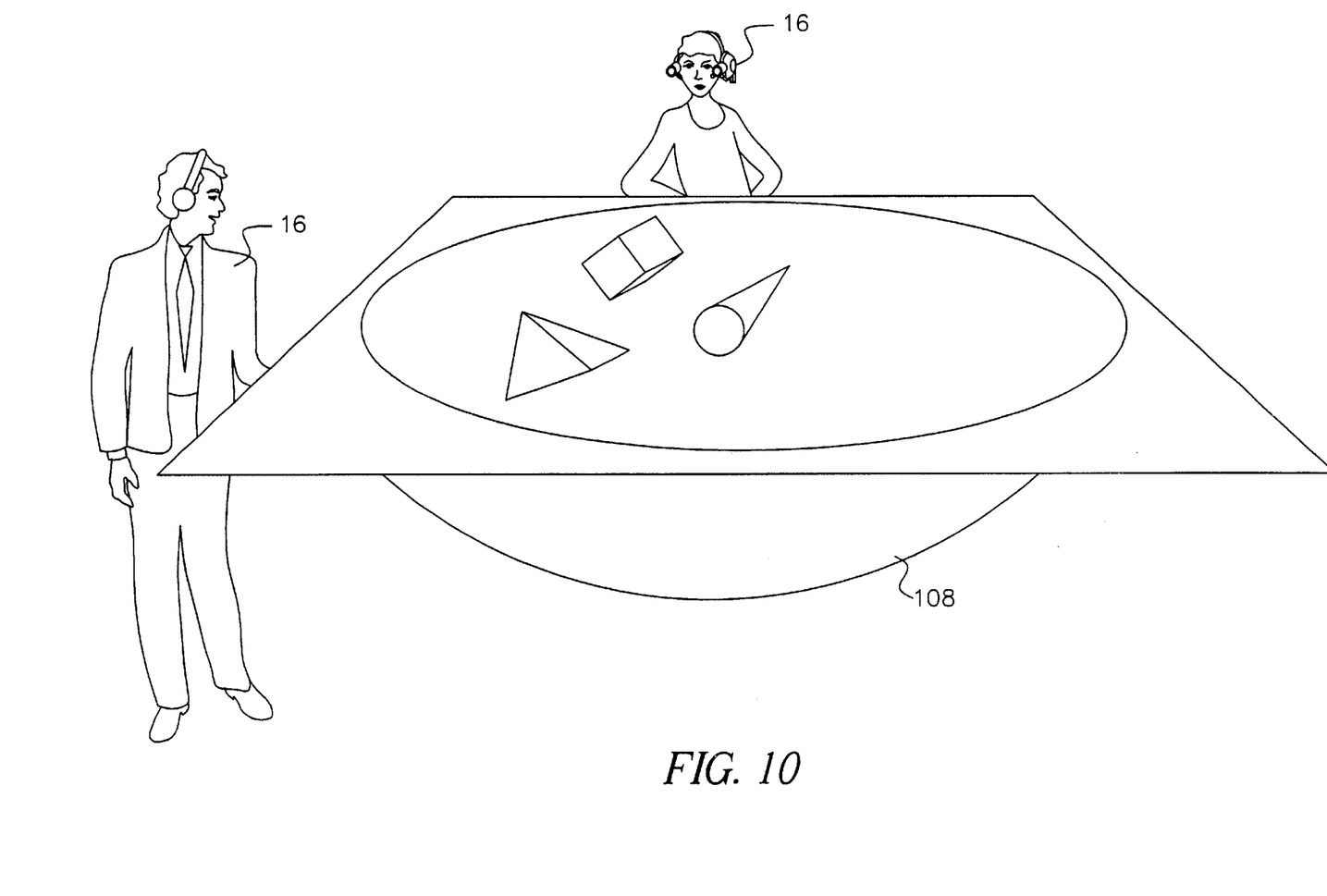

As described earlier for the chair-mounted embodiment of FIG. 1, various alternative screen configurations and arrangements can be used with the head-mounted embodiment including spherical screens or configurations of retro-reflective material attached to walls, ceilings and the like. As an alternative to planar or cylindrical screens, FIG. 10 illustrates how a spherical screen 108 can be used to allow wider ranges of free movement to an observer 16. With the extra freedom of motion afforded the observer wearing the head-band mounted projector, the screen(s) can also be mounted in a variety of planes, used as tabletops, upright windows, canted, or mounted like a ceiling. Systems analogous to that depicted in FIG. 10 could be envisioned for the chair-mounted embodiment of FIG. 1 in a form ranging from a full spherical screen with a transparent plane used as a floor or with the chair positioned in the center of smaller subsections of a spherical screen.

The invention has been described in detail with particular reference to certain preferred embodiments thereof, but it will be understood that variations and modifications can be effected within the scope of the invention.

Parts List 10 a system for autostereoscopic viewing
14 modified retro-reflective screen
16 observer/observer's head
18 chair
21 computer
22 imaging/audio system
23 audio/video/feedback input lines
24 digital image source
26 power supply
28 condenser lens assembly
30 IR filter
32 input end of fiberoptic bundle
34 fiberoptic bundle
36 illumination system
38, 40 image projectors
42 headrest
44 observer eyes
46 audio transducers
48 observer head
52 output end of fiberoptic bundle
54 light valve array
56 polarizer
58 analyzer 587733W
60 lens assembly
70 elongated image area
72 round image area
80 regular retroreflector screen
82 light beams
84 screen feet
86 screen boom
90 forward end of the lens assembly
92 supports structure
96 rotational encoder
106 cylindrical screen
108 spherical screen
110 head mounted projection system
112 headband
114 positioning subassembly
116 UV source
118 UV camera
120 fiducial marks
122 CCD sensor array
124 objective lens
126 lens assembly
128 light source
130 light valve

What is claimed is:

1. An autostereoscopic image projection system comprising:

a support structure;

a left projector mounted on said support structure at a first location for projecting a left multicolor image;

a right projector mounted on said support structure at a second location for projecting a right multicolor image; and a modified retroreflective screen for reflecting at least a portion of said left image directly from said left projector to a left eye of an observer and for reflecting at least a portion of said right image to a right eye of said observer so that the reflective image forms an elongated image area for being viewed by the eye of the observer, said left and right projectors being positioned a distance from said left and right eyes.

2. An autostereoscopic image projection system according to claim 1 wherein said retroreflective screen comprises a plurality of modified cube-corner reflectors.

3. An autostereoscopic image projection system according to claim 1 wherein said retroreflective screen is curved.

4. An autostereoscopic image projection system according to claim 1 wherein said support structure is a chair.

5. An autosterescopic image projection system according to claim 4 wherein said screen is attached to said chair.

6. An autostereoscopic image projection system according to claim 1 wherein said support structure is a headband worn on said observer's head.

7. An autostereoscopic image projection system according to claim 1 further comprising:

an orientation and position sensing subsystem for sensing the orientation and position of said left and right projectors; and a processor, responsive to said sensing subsystem, to compute and deliver to said left and right projectors signals which correspond to imagery that shifts and distorts to compensate for shifting and distorting caused by changes in said orientation and position of said left and right projectors.

8. An autostereoscopic image projection system according to claim 7 wherein said orientation and position sensing subsystem senses fiducial marks, said fiducial marks being in a fixed location with respect to said retroreflective screen.

9. An autostereoscopic image projection system according to claim 5 further comprising:

an orientation and position sensing subsystem for sensing the orientation and position of said left and right projectors, said orientation and position sensing subsystem comprising at least one rotational position encoding device; and a processor, responsive to said sensing subsystem, to compute and deliver to said left and right projectors signals which correspond to imagery that shifts and distorts to compensate for shifting and distorting caused by changes in said orientation and position of said left and right projectors.

10. An autostereoscopic image projection system according to claim 1 further comprising an automatic ranging and focussing subsystem for sensing the distance from said left and right projectors to said retroreflective screen and adjusting the focus of said left and right projectors in accord with said sensed distance.

11. An autostereoscopic image projection system according to claim 1 further comprising a pair of left and right audio transducers mounted on said support structure and arranged to deliver left and right audio channel information to respective left and right ears of said observer.

12. A method of projecting a stereoscopic image for viewing by an observer, comprising the steps of:

positioning a left and a right projector a distance from a left and a right eye respectively of said observer, said projectors projecting a left and a right multicolor image respectively on a modified retroreflective screen; and returning by said retroreflective screen at least a portion of light from said left and right multicolor images directly to said left and right eyes respectively of said observer so that said observer sees a stereoscopic image, a lead portion of light as reflective to said eye of said observer being in the form of an elongated image area.

13. A method of projecting a stereoscopic image according to claim 12 further comprising the steps of:

sensing the orientation and position of said left and right projectors; and computing and delivering to said left and right projectors signals which correspond to imagery that shifts and distorts to compensate for shifting and distorting caused by changes in said orientation and position of said left and right projectors.

14. A method of projecting a stereoscopic image according to claim 12 further comprising the step of:

sensing the distance from said left and right projectors to said retroreflective screen and adjusting the focus of said left and right projectors in accord with said sensed distance.

* * * * *